United States Patent Office 3,168,559
Patented Feb. 2, 1965

3,168,559
MIXED ANHYDRIDES OF AN AMINOCARBOXYLIC ACID AND AN ALKYL SUBSTITUTED BORIC ACID
Konrad Lang, Friedrich Schubert, and Karl Nützel, Leverkusen, Germany, assignors to Farbenfabriken Bayer Aktiengesellschaft, Leverkusen, Germany, a corporation of Germany
No Drawing. Filed June 23, 1960, Ser. No. 38,394
Claims priority, application Germany June 27, 1959
16 Claims. (Cl. 260—545)

Practically all boron compounds which possess boron-carbon linkages show a frequently outstanding sensitivity to oxygen. In a series of cases e.g. with boron trimethyl, boron triethyl and boron tripropyl these boron-carbon linkages are spontaneously disrupted in air. Other boron compounds of this kind are auto-oxidized by the action of atmospheric oxygen, these substances including for example the alkyl or aryl-boronic acids or borinic acids and their functional derivatives. The esters and anhydrides of these acids including the boroxoles and the mixed anhydrides of dialkylboronic acids and carboxylic acids are moreover very sensitive to moisture.

Addition compounds with ammonia or amines of a few of these boron organic compounds have been described; even these show instability, although in some cases reduced, against atmospheric oxygen.

These properties: sensitivity to air and ready hydrolyzability hindered hitherto the technical evaluation of these materials.

Objects of this invention include novel air and moisture stable, mixed anhydrides of amino carboxylic acids with alkyl-, cycloalkyl- or arylboronic acids or dialkyl, dicycloalkyl; or diaryl borinic acids.

Further objects of the invention are new air- and moisture-stable cyclic mixed anhydrides of dialkyl borinic acids and α- or β-amino carboxylic acids.

Other objects of the invention are new air- and moisture-stable cyclic mixed anhydrides of alkyl boronic acids and aryl-o-amino carboxylic acids.

Further objects of the invention are new air- and moisture-stable high polymeric mixed anhydrides of dialkyl- or diaryl-borinic acids and amino carboxylic acids.

A further object of the invention is a process of production for the above mentioned air- and moisture-stable mixed anhydrides of amino carboxylic acids and organic boronic acids or borinic acids.

It has been found that boron trialkyls, boron tricycloalkyls, or boron triaryls react when heated with amino carboxylic acids with separation of hydrocarbon to give mixed anhydrides of amino carboxylic acids with alkyl-, cycloalkyl- or aryl boronic acids or dialkyl-, dicycloalkyl- or diaryl boronic acids, e.g. according to the following equations:

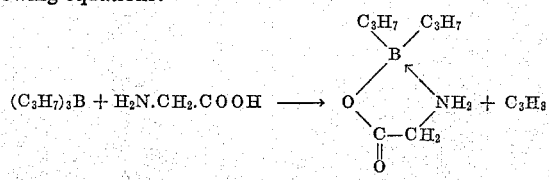

B-dipropyl-boroxazolidone (=mixed anhydride of dipropylborinic acid and glycine)

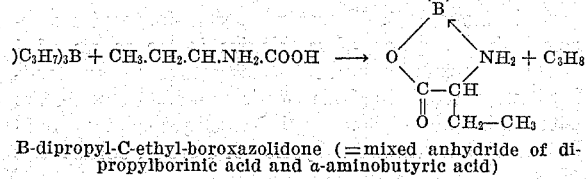

B-dipropyl-C-ethyl-boroxazolidone (=mixed anhydride of dipropylborinic acid and α-aminobutyric acid)

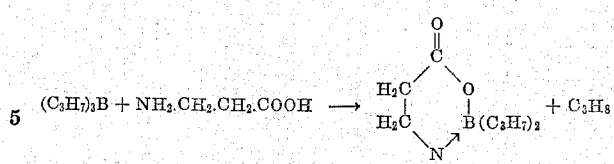

B-dipropyl-boroxazone (=mixed anhydride of dipropylborinic acid and β-alanine)

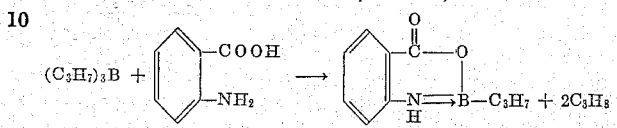

B-propylbenzboroxazone (=mixed anhydride of propylboronic acid and anthranilic acid)

Starting from the α-amino carboxylic acids compounds result which derive from five membered rings which are called boroxazolidones (1 - oxa - 2 - bora - 3 - aza-cyclopentanone-5); by using β-amino-carboxylic acids six membered rings are formed: boroxazones (1-oxa-2-bora-3-aza-cyclohexanone-6)

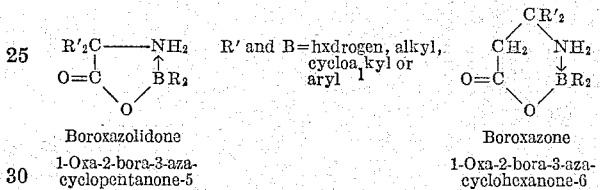

Boroxazolidone
1-Oxa-2-bora-3-aza-cyclopentanone-5

Boroxazone
1-Oxa-2-bora-3-aza-cyclohexanone-6

Under special conditions, e.g. if the formation of a pseudo-aromatic multiple bond system is made possible, further condensation occurs;

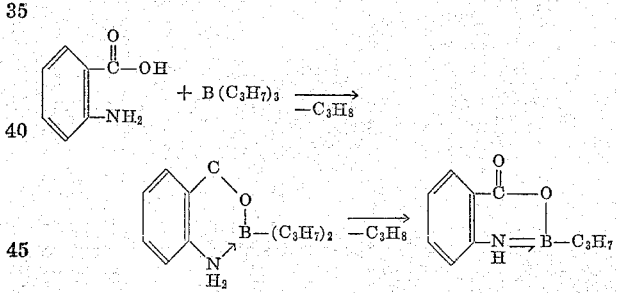

By using amino carboxylic acids in which the $NH_2$-group is not in the α- or β-position to the carboxyl group, e.g. of ω-amino carboxylic acids, such as 6-amino caproic acid, higher molecular (polymeric) and likewise very stable products result by intermolecular complex formation.

The formation of the ring compounds by intermolecular complex formation is improved according to known principles by applying solvents (Ziegler ring closure) e.g. high boiling hydrocarbons such as o-xylene.

By working without solvents on the other hand, intermolecular complexing leads to the formation of larger or smaller amounts of high polymeric mixed anhydrides which on their part possess valuable properties.

In the chemical literature (Gmelins Handbuch der Anorganischen Chemie, System Nr. 13, Ergänzungsband, page 218; Meerwein et al. Journ. prakt. Chemie 147 (1936) 251/5) the reaction is described of acetic acid with boron triethyl to give mixed anhydrides of diethyl borinic acid and acetic acid. This compound is however very sensitive to oxygen and is rapidly decomposed by hydrolysis by atmospheric moisture. It is therefore fundamentally distinguished from the compounds of the present invention which are stable to oxygen and moisture. Since also the ammonia or amine adducts of the above mentioned air- and moisture-sensitive boron hydrocarbon compounds are likewise unstable to oxygen and water, it must surprise the men skilled in the art that by the reaction of boron trialkyls or boron triaryls with amino carboxylic acids, stable substances result.

In the process according to the invention there may be applied as boron carbon compounds boron trialkyls, for example boron triethyl, the isomeric boron tripropyls, boron tributyls, boron tripentyls, boron tridodecyl, boron tridecyl; boron cycloalkyls such as boron tricyclohexyl; and boron triaryls such as boron triphenyl or boron trinaphthyl. It is expedient to use boron hydrocarbons boiling above 120–150° C.

As amino carboxylic acids there may be used α-amino carboxylic acids e.g. glycocoll, α-alanine, cysteine, lanthionin, phenylalanine, tryptophane, α-aminobutyric acid, methionine, valine, norvaline, O-methyl-serine, leucine, isoleucine, norleucine; and β-amino carboxylic acids such as β-alanine, β-aminobutyric acid, o-aminobenzoic acid (anthranilic acid); and ω-amino carboxylic acids e.g. 6-aminocaproic acid and p-aminobenzoic acid.

The reaction is advantageously conducted in such a way that the boron hydrocarbon is mixed with the amino carboxylic acid optionally with the use of a solvent, heated with stirring to the reaction temperature and this temperature then maintained long enough for the calculated quantity of hydrocarbon to be split off. By using boron hydrocarbons whose bonds derive from readily volatile hydrocarbons, the course of the reaction is especially simply followed with the aid of a gasometer measuring the hydrocarbon evolved. If boron triphenyl is used, the benzene distilled off is correspondingly measured.

With some amino carboxylic acids such as anthranilic acid the reaction proceeds even below 100° C. e.g. at 80° C., with satisfactory speed. In most cases however heating up to temperatures above 100° C., expediently to 130–160° C., is necessary.

On account of the sensitivity to air of the boron hydrocarbons used as starting material one works with advantage in an inert gas atmosphere, e.g. of nitrogen or argon.

The substances produced according to the process of the invention are valuable products. They can be added to lead-containing fuels for sparking ignited internal combustion engines and mixed with sulphur and phosphorus compounds of type described in British patent specification 829,635, hinder the formation of deposits on the cylinders. They are plant protection agents, e.g. green spider mites T. teraius of a strain completely resistant to other plant protection agents are killed by 0.2% aqueous solutions or suspensions of B-propyl benzboroxazone (mixed anhydride of propyl boronic acid and anthranilic acid), B-dipropyl-C-methyl-boroxazolidone (mixed anhydride of dipropyl borinic acid and α-alanine) or B-dipropyl-C-ethyl-boroxazolidone (mixed anhydride of dipropyl borinic acid and α-amino-butyric acid).

*Example 1*

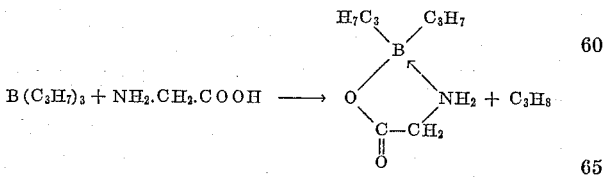

A mixture of 70 grams of boron tri-n-propyl, 237.5 grams of glycocoll and 400 ml. of o-xylene are slowly heated under nitrogen in a flask with stirring. At 120° C. propane evolution sets in, the temperature is raised to reflux and the mixture is held 3 hours at this temperature. The solvent is then distilled in vacuum at the lowest possible temperature and the last residues removed by washing with a little ether. The solid white crystalline dipropyl boroxazolidone (mixed anhydride of glycine and dipropyl borinic acid) obtained in 90% yield is soluble in glacial acetic acid and may be precipitated from this solution with water.

The melting point is above 200° C. The compound is stable against moisture and air.

*Analysis.*—Calculated: 6.3% boron; 56.2% C; 10.6% H; 8.2% N. Found: 6.17% boron; 55.3% C; 10.2% H; 8.0% N. Molecular weight: Calculated 161. Found: 165.

*Example 2*

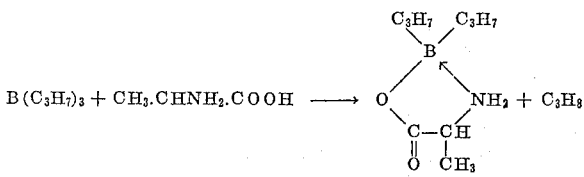

As in Example 1, 70 grams of boron tri-n-propyl are reacted with 44 grams DL-α-alanine in 400 ml. o-xylene. From the reaction product completely freed from xylene, the resulting B-dipropyl-C-methyl-boroxazolidone (mixed anhydride of dipropyl borinic acid and α-alanine is isolated by extraction with ether. Yield 80% of the theoretical. Melting point 120° C.; the compound is stable against moisture and air.

Calculated: 5.84% boron; 58.15% C; 10.82% H; 7.56% N. Found: 5.62% boron; 57.1% C; 10.6% H; 7.7% N.

*Example 3*

$$B(C_3H_7)_3 + CH_3.CH_2-CHNH_2-COOH \longrightarrow$$

$$\begin{array}{c} C_3H_7 \quad C_3H_7 \\ \diagdown B \diagup \\ O \diagup \quad \diagdown NH_2 \\ \diagdown C-CH \\ \parallel \quad \mid \\ O \quad CH_2-CH_3 \end{array} + C_3H_8$$

As in Example 1, 70 grams of boron tri-n-propyl are reacted with 51.5 grams of α-amino-butyric acid in 5400 ml. of ortho-xylene. From the reaction product completely freed of xylene the B-dipropyl-C-ethyl boroxazolidone (mixed anhydride of dipropyl borinic acid and α-aminobutyric acid) is extracted with dry ether. Yield 85% of the theoretical. Melting point 84° C.

Calculated: 5.44% boron; 63.0% C; 11.1% H; 7.05 N. Found: 5.54% boron; 60.3% C; 10.9% H; 7.1% N.

The compound is stable against moisture and air.

*Example 4*

$$B(C_3H_7)_3 + CH_3.S.(CH_2)_2.CH(NH_2).COOH \longrightarrow$$

$$\begin{array}{c} H_7C_3 \quad C_3H_7 \\ \diagdown B \diagup \\ O \diagup \quad \diagdown NH_2 \\ \diagdown C-CH \\ \parallel \quad \mid \\ O \quad CH_2 \\ \quad \mid \\ \quad CH_2 \\ \quad \mid \\ \quad S \\ \quad \mid \\ \quad CH_3 \end{array} + C_3H_8$$

As in Example 1, 47 grams boron tri-n-propyl are reacted with 50 grams of methionine in the course of 4 hours. The reaction product which crystallizes on standing is very soluble in glacial acetic acid and possesses the composition of a B,B-dipropyl-C-(methylmercaptoethyl)-boroxazolidone (mixed anhydride of dipropyl borinic acid and methionine). This substance is stable against air. Melting point 185° C. with decomposition. Calculated: 4.42% boron. Found: 4.57% boron.

Example 5

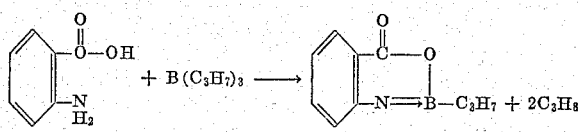

60 grams of recrystallized anthranilic acid are heated to 135° C. in 250 ml. of ortho-xylene and 61.5 grams of boron tri-n-propyl are added dropwise with stirring. Propane is strongly evolved. After ending the addition of boron tri-n-propyl heating is continued to reflux and this temperature maintained until the completion of the evolution of propane. The mixture is allowed to cool, the precipitated product which crystallizes in fine leaves is filtered off, washed with a little cold xylene and then with dry ether and dried. The B-propyl benzboroxazone (mixed anhydride of propyl boronic acid and anthranilic acid) thus obtained is soluble in xylene, ether and glacial acetic acid. Melting point after crystallization from toluene: 140° C.

Calculated: 5.71% boron; 63.5% C; 6.4% H; 7.4% N. Found: 5.8% boron; 62.4% C; 6.4% H; 7.3% N.

The compound is absolutely stable against air and moisture.

Example 6

In a three-necked flask with a stirrer, reflux condenser and thermometer, 97 ml. (½ mol) of boron tri-n-propyl are introduced under argon. In the argon stream 21.8 grams (⅙ mol) of 6-amino-caproic acid are introduced and the mixture warmed to 150° C. Propane is developed and the content (mixed anhydride of dipropyl borinic acid and 6-aminocaproic acid) solidifies to white crystals which melt in the region of 180–189° C. with decomposition.

The mixed anhydrides of hydrocarbon substituted borinic acids and boronic acids resp. with amino carboxylic acids possess high stability against the attack of moisture and air at room temperature. The molecular weight, determined by the ebullioscopic method, correspond to monomeric molecules. As the mixed anhydride of diethylborinic acid and acetic acid is rapidly destroyed by water and/or air the high stability of the compounds according to this invention can be explained only by the assumption that the molecules are of cyclic form.

We claim:

1. The mixed anhydride of an amino carboxylic acid selected from the group consisting of amino alkyl carboxylic acids containing up to six carbon atoms and amino aryl carboxylic acids containing up to eight carbon atoms, with an organic substituted boric acid selected from the group consisting of dialkyl borinic acids, the alkyl radicals of which contain up to thirteen carbon atoms, diaryl borinic acids, the aryl radicals of which contain up to ten carbon atoms, dicycloalkyl borinic acids, the cycloalkyl radicals of which contain up to six carbon atoms, alkyl boronic acids, the alkyl group of which contains up to thirteen carbon atoms, aryl boronic acids, the aryl radical of which contains up to ten carbon atoms, and cycloalkyl boronic acids, the cycloalkyl radical of which contains up to six carbon atoms.

2. The mixed anhydride of an α-aminoalkyl carboxylic acid containing up to six carbon atoms and a dialkyl borinic acid, the alkyl radicals of which contain up to 13 carbon atoms.

3. The mixed anhydride of a β-aminoalkyl carboxylic acid containing up to six carbon atoms and a dialkyl borinic acid, the alkyl radicals of which contain up to 13 carbon atoms.

4. The mixed anhydride of an o-aminoaryl carboxylic acid containing up to 8 carbon atoms and monoalkyl boronic acid, the alkyl radical of which contains up to 13 carbon atoms.

5. The mixed anhydride of glycocoll and dipropyl borinic acid of the formula

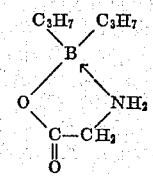

6. The mixed anhydride of α-alanine and dipropyl borinic acid of the formula

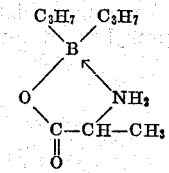

7. The mixed anhydride of α-amino-butyric acid and dipropyl borinic acid of the formula:

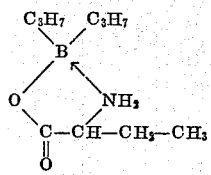

8. The mixed anhydride of methionine and dipropyl borinic acid of the formula

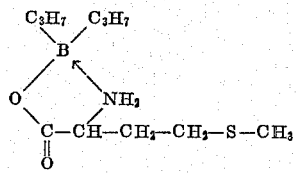

9. The mixed anhydride of anthranilic acid and propyl boronic acid of the formula

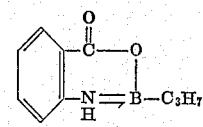

10. Process for the production of a mixed anhydride of an amino carboxylic acid with an organic substituted boric acid which comprises reacting at a temperature in the range of from about 80° to about 160° C., an amino carboxylic acid selected from the group consisting of aminoalkyl carboxylic acids containing up to six carbon atoms and aminoaryl carboxylic acids containing up to eight carbon atoms with boron hydrocarbons selected from the group consisting of boron trialkyls, the alkyl radicals of which contain up to thirteen carbon atoms, boron triaryls, the aryl radicals of which contain up to ten carbon atoms and boron tricycloalkyls, the cycloalkyl radicals of which contain up to six carbon atoms, and recovering the mixed anhydrides thereby formed.

11. Process according to claim 10 wherein the reaction is carried out in the presence of hydrocarbons, the boiling points of which are above the reaction temperatures.

12. Process for the production of the mixed anhydride of glycine and dipropyl borinic acids which comprises heating an equimolecular mixture of glycine and boron tri-n-propyl in ortho-xylol to a temperature of about 120° C., refluxing the reaction mixture until one mol of propane for each mol of boron tripropyl has split off, and recovering the mixed anhydride thus formed.

13. Process for the production of the mixed anhydride of α-alanine and dipropyl borinic acid which comprises heating an equimolecular mixture of α-alanine and boron tri-n-propyl in ortho-xylol to a temperature of about 120° C., refluxing the reaction mixture until one mol of propane for each mol of boron tripropyl has split off, and recovering the mixed anhydride thus formed.

14. Process for the production of the mixed anhydride of α-amino butyric acid and dipropyl borinic acid which comprises heating an equimolecular mixture of α-amino butyric acid and boron tri-n-propyl in ortho-xylol to a temperature of about 120° C., refluxing the reaction mixture until one mol of propane for each mol of boron tripropyl has split off, and recovering the mixed anhydride thus formed.

15. Process for the production of the mixed anhydride of anthranilic acid and propyl boronic acid which comprises heating an equimolecular mixture of anthranilic acid and boron tri-n-propyl in ortho-xylol to a temperature of about 120° C., refluxing the reaction mixture until two mols of propane for each mol of boron tripropyl has split off, and recovering the mixed anhydride thus formed.

16. Process for the production of the mixed anhydride of methionine and dipropyl borinic acid which comprises heating an equimolecular mixture of methionine and boron tri-n-propyl in ortho-xylol to a temperature of about 120° C., refluxing the reaction mixture until one mol of propane for each mol of boron tripropyl has split off, and recovering the mixed anhydride thus formed.

References Cited in the file of this patent

Meerwein et al.: J. prakt. Chemie, vol 147, pages 251–256 (1936).